United States Patent [19]

Breeze, Jr. et al.

[11] 4,270,237

[45] Jun. 2, 1981

[54] PORTABLE APPARATUS FOR ASSEMBLING NUTS AND WASHERS ON THREADED STUDS

[75] Inventors: Marvin M. Breeze, Jr.; Virgil W. Wood, both of Rockwall, Tex.

[73] Assignee: Western Electric Company, Inc., New York, N.Y.

[21] Appl. No.: 87,124

[22] Filed: Oct. 22, 1979

[51] Int. Cl.³ .................................................. B23P 19/08
[52] U.S. Cl. ...................................... 10/155 R; 81/54
[58] Field of Search ............. 81/3 R, 54, 10; 29/714, 29/719, 787, 813; 10/155 R, 155 A, 162 M

[56] References Cited

U.S. PATENT DOCUMENTS

| | | | |
|---|---|---|---|
| 2,728,091 | 12/1955 | Hoenk | 10/155 R |
| 2,752,618 | 7/1956 | Stern | 10/155 R |
| 2,910,768 | 11/1959 | Heidergott et al. | 29/714 |
| 2,943,335 | 7/1960 | Daniel et al. | 10/155 R |
| 3,187,356 | 6/1965 | Rodenberg | 10/155 R |
| 3,406,414 | 10/1968 | Kulaga et al. | 10/155 R |
| 3,694,888 | 10/1972 | Bosse | 10/155 R X |

Primary Examiner—Mark Rosenbaum
Attorney, Agent, or Firm—R. P. Miller

[57] ABSTRACT

A portable tool is provided to assemble washers (13) and nuts (14) on threaded studs (10) extending from a frame member (11,12). Pneumatically operated pushers (43,54) advance a polygonal-shaped nut and a round washer into a polygonal-shaped chamber (24) formed by a sleeve (26) and a polygonal-shaped driver rod (29). The end of the sleeve is placed over a threaded stud and forced against the frame member, whereupon a clutch (32) is disengaged and rotative power is applied to the driver rod and the sleeve while the driver rod is moved within the sleeve to push the washer and the rotating nut onto the threaded stud. The clutch in the engaged position is constructed so as to insure that slots (63 and 64) in the sleeve (26) are aligned with the pushers (43 and 54) to permit entry of the washers and the nuts into the chamber where they are magnetically held.

12 Claims, 8 Drawing Figures

PORTABLE APPARATUS FOR ASSEMBLING NUTS AND WASHERS ON THREADED STUDS

FIELD OF THE INVENTION

This invention relates to portable apparatus for feeding and assembling nuts and washers on threaded studs, and more particularly to an air operated apparatus for feeding washers and nuts into a sleeve, wherein the washers and nuts are held until pushed by a driver onto a stud whereafter the sleeve is rotated to assemble the washers and nuts onto the stud.

BACKGROUND OF THE INVENTION

In the assembly of various types of equipments, such as telephone switching frames, there are continued needs for automatic tools to assemble various fasteners, such as bolts, threaded studs, washers and nuts. Switching frames are made up of angular metal sections to form housings or mountings for numerous sub-assemblies or modules of electrical, electronic and semi-conductor devices. The sub-assemblies and modules are secured in the frame by fixing threaded studs within the frame to pass through holes formed in the sub-assemblies and modules so that washers and nuts may be assembled on the projecting portion of the threaded studs.

These fastener assembly operations are time consuming and tedious when use is made of manually operated tools, such as socket wrenches. Even if power driven socket wrenches are utilized, the operator must pick up and place washers and nuts on the threaded studs prior to the final assembly with the power driven hand operated tool.

It may be appreciated that there are needs for portable apparatus that can automatically feed nuts and washers from supply sources in oriented relation so that an automatic assembly tool can function to automatically assemble the nuts and washers onto a threaded stud. Such portable apparatus should be adapted for movement with the operator for use at different work locations or for nut and washer assembly operations at diverse sites on a frame.

Bench mounted non-portable apparatuses have been designed to provide facilities for feeding washers and nuts to an assembly position whereat a socket-like automatic tool is utilized to assemble the nuts and washers on threaded bolts or studs. In U.S. Pat. No. 3,406,414 issued Oct. 22, 1968, to S. Kulaga et al., there is shown a vibratory system for feeding nuts and washers into a bench mounted facility wherein a socket is advanced to pivot gripping members out of position, whereafter the socket is advanced over the nut to move the nut along a guide pin or probe onto a threaded stud. The descending socket is rotated to thread the nut onto the threaded stud.

Other types of bench mounted devices are known to automatically assemble groups of washers on diversely located studs. One such device is shown in U.S. Pat. No. 2,910,768 issued Nov. 3, 1959, to H. W. Heidergott et al., wherein stacks of washers are positioned in lateral alignment with a number of studs so that operation of a number of pushers results in the advance of one or more washers from each stack into positions that are axially aligned with the studs. Next, a group of pilot pins are passed through the washers so that release of the washers results in the washers being guided onto the studs.

SUMMARY

This invention contemplates, among other things, a portable nut, washer and threaded stud assembly apparatus wherein a sleeve having a polygonal-shaped interior is slotted to receive a nut and washer, whereafter a polygonal-shaped driver rod is axially moved to release a clutch that causes rotative power to be transmitted to the driver rod and the sleeve. Subsequent axial movement of the driver rod pushes the nut and washer onto a threaded stud so that the rotating sleeve assembles the nut on the threaded stud.

More particularly, washers and nuts are stacked in the portable apparatus and a pair of trigger actuated air cylinders are operated to push a lower washer and a lower nut into the sleeve. Facilities are provided to accurately orient the pushed nut to be accommodated within the polygonal-shaped sleeve. The washer and nut may be constructed of magnetically attractable material so that a magnet positioned on the end of the driver rod acts to hold the washer and nut within the sleeve. The apparatus may be readily transported to a work location where the end of the sleeve is placed over a threaded stud. Next, an air motor attached to the driver rod is pushed toward the threaded stud to effectuate the release of the clutch, whereupon rotative power is applied to both the driver rod and the sleeve to thread the nut onto the stud.

The apparatus features a simple clutching device which when engaged precisely positions entry slots formed in the sleeve in alignment with a washer and a nut being advanced from the respective stacks.

BRIEF DESCRIPTION OF THE DRAWINGS

Other features and advantages of the present invention will be apparent upon consideration of the detailed description in conjunction with the drawings, wherein.

DETAILED DESCRIPTION

Figure 1:
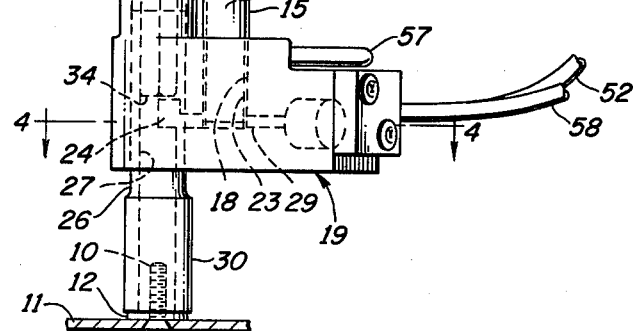
FIG. 1 is a perspective view of a nut, washer and threaded stud which may be assembled by use of the apparatus of the present invention.

Referring to FIG. 1, there is shown a threaded stud 10 extending from a fixed frame member 11 and passing through a bore formed in a member 12 which may be part of a modular frame or other device that is to be mounted on frame 11. There is also shown a washer 13 and a nut 14 that are assembled on the stud 10 with the apparatus forming the subject matter of this invention. The apparatus is designed to feed both washers and nuts but is can also be selectively operated to feed either washers or nuts. In the principal embodiment of the invention, it is contemplated that the washers 13 or both the washers and the nuts are constructed of ferromagnetic material.

Figure 2:
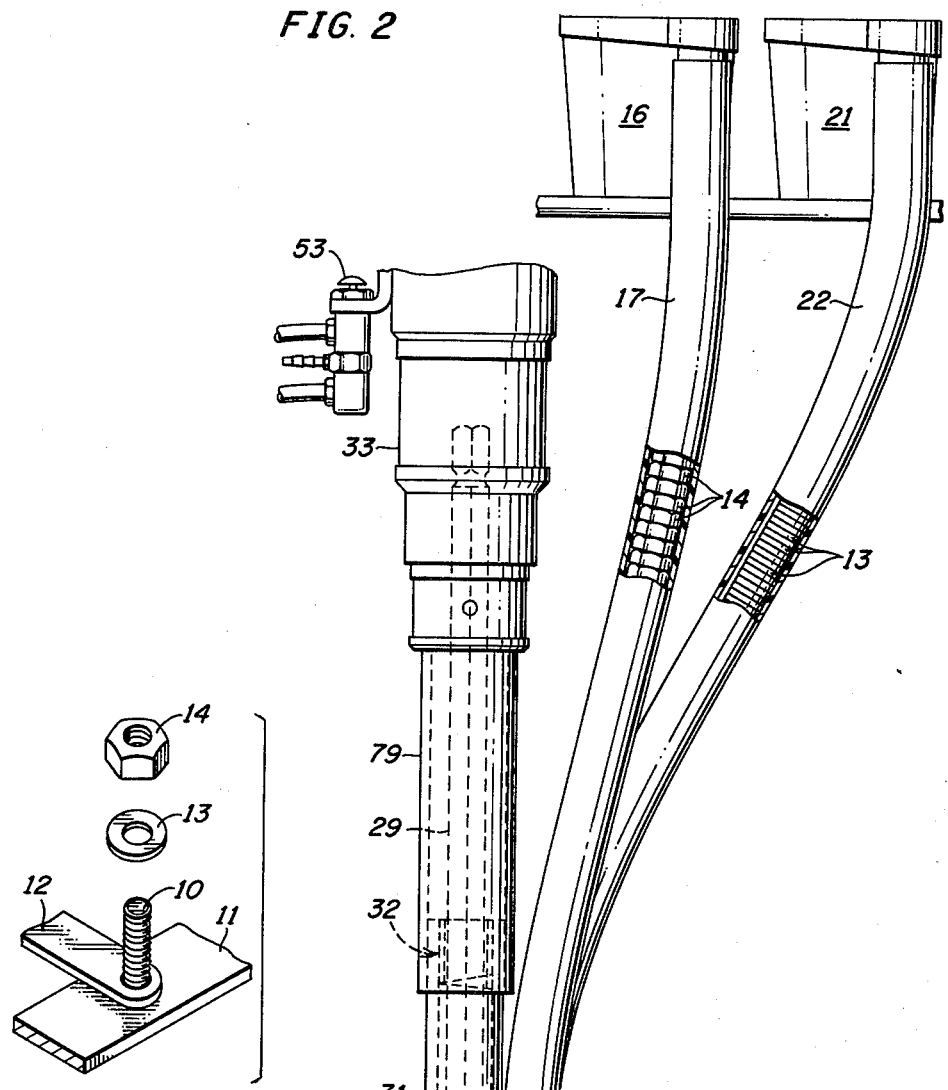
FIG. 2 is a side elevational view of the nut and washer assembly apparatus together with a showing of vibratory facilities for feeding nuts and washers to the assembly apparatus, which apparatus embodies the principles of the present invention.

In general, referring to FIG. 2, there is shown a first commercial vibratory hopper 16 for feeding nuts 14 along a flexible tube 17 through a detachable tube 15 into a cylindrical opening 18 formed in a tubular section of a housing 19 wherein the nuts are stacked on top of each other. In a like manner, a similar commercial vibratory hopper 21 feeds washers 13 along a flexible tube 22 through a second detachable tube 20 into a second cylindrical opening 23 formed in a second tubular section of the housing 19 to form a stack of washers therein.

A bottom washer and a bottom nut are advanced from the respective stacks into an aligning chamber 24 formed in a sleeve 26 having an inner surface 27 (see also FIGS. 3 and 4) configured in a polygonal shape corresponding to the polygonal shape of the nuts. In the drawings, the nuts are illustrated as being hexagonal nuts. As the nut is advanced into the chamber, it is oriented into a position to allow seating within the chamber. A driver rod 29 slidably projects into the upper portion of the sleeve 26 to define the upper extremity of the chamber. The driver rod 29 is fabricated with a polygonal periphery corresponding to the polygonal shape of the interior of the sleeve 26. The housing 19 is provided with a tubular extension 31 which surrounds the driver 29 in spaced relation. Interposed between the tubular extension 31 and the driver rod 29 is a clutching means 32 which is disengaged when the driver rod 29 is axially moved relative to the tubular housing 31. The upper end of the driver rod is secured in a chuck driven by a commercial air motor 33. A suitable motor of this type is available as Cleco Air driver Model 4 RSA-10 which may be obtained from Dresser Ind. Inc., Franklin Park, Ill. The driver rod 29 is provided with a magnet 34 at its lower extremity for the purpose of holding the ferromagnetic washer and nut in the chamber 24.

Briefly, in use, a nut 14 and a washer 13 are advanced into the sleeve chamber 24 and there held in axial alignment by the magnet 34. The using operator will place the lower end of the sleeve 26 over a secured stud 10 projecting from a support frame 11 through a member 12. The housing for the motor 33 is pushed downwardly, thus moving the driver rod 29 downward relative to the tubular extension 31 so that the clutch 32 is released, whereafter the continued movement of the rod pushes the nut onto the top of the stud. The release of the clutch is accompanies by rotative power being imparted to the advancing driver rod 29 and, as a consequence, rotative power is also imparted to the sleeve 26 to turn and thread the nut 14 onto the stud 10. Obviously, the advance of the nut 14 pushes the washer onto the stud.

Figure 3:
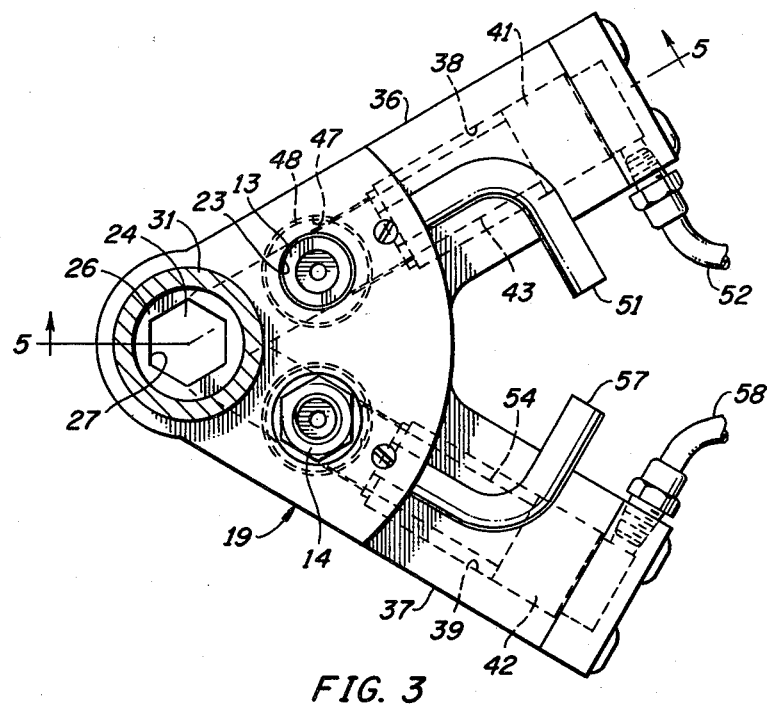
FIG. 3 is a top view of the apparatus particularly showing an arrangement of air cylinders for feeding washers and nuts into an aligning chamber.
Figure 4:
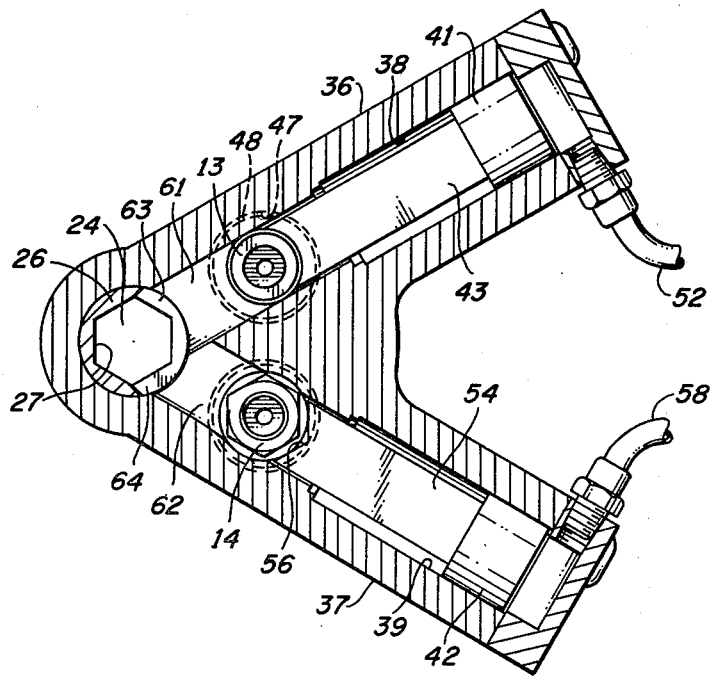
FIG. 4 is a cross-sectional view taken along line 4—4 of FIG. 2 showing the air cylinder operated pushers for advancing the nut and washer into the aligning chamber.
Figure 5:
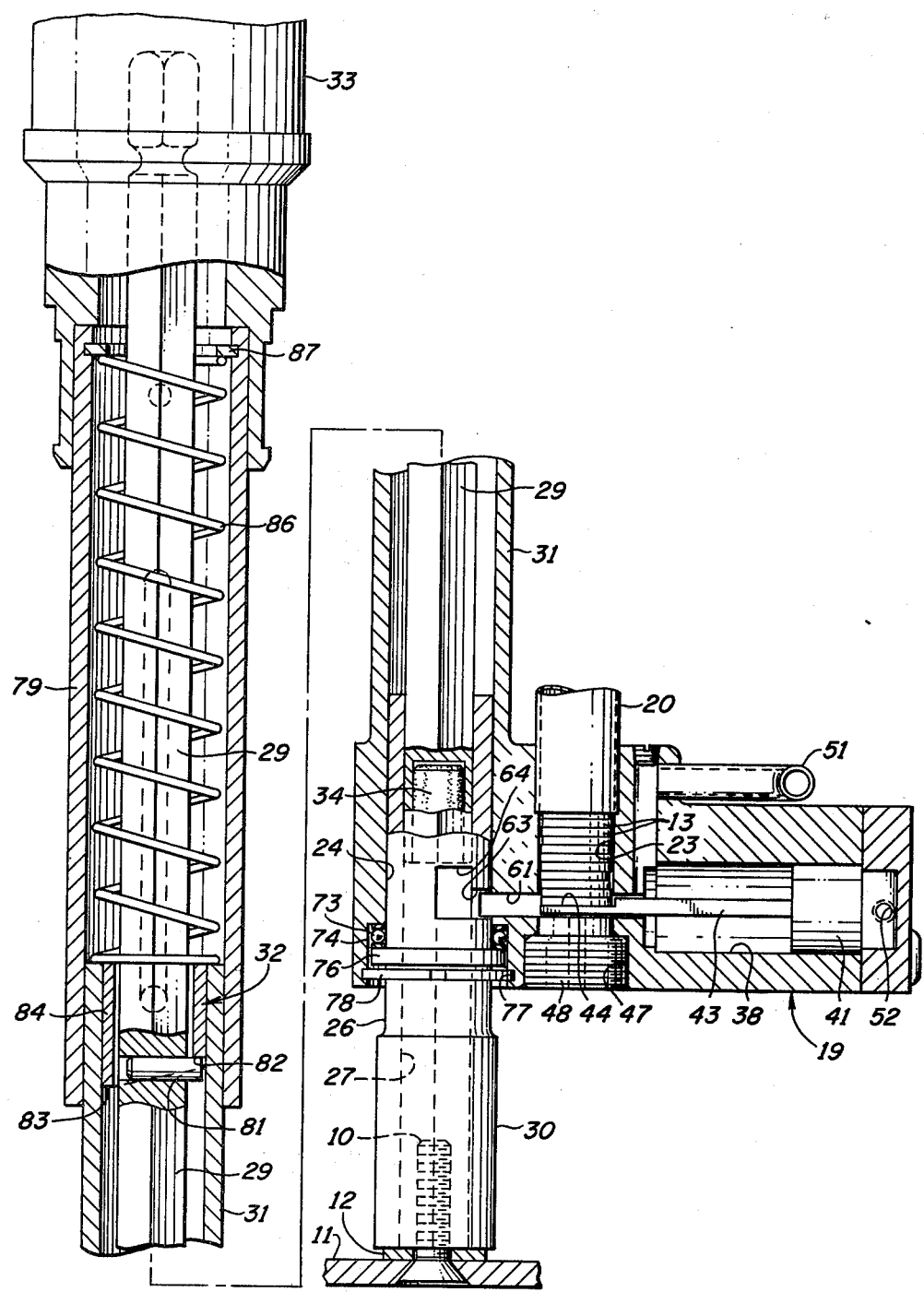
FIG. 5 is a sectional view taken along the line 5—5 of FIG. 3 particularly showing the structural details of the air cylinder and pusher for moving a washer into the aligning chamber together with a showing of an actuator rod and a clutch for controlling the rotation of the actuator rod.

Considering the details of construction of the apparatus, the housing 19 is provided with a section that is V-shaped in cross section as shown in FIGS. 3 and 4 to provide a pair of legs 36 and 37 in which are formed a pair of cylinder chambers 38 and 39 that receive a pair of air operated pistons 41 and 42. Piston 41 has a pusher extension or blade 43 which is fabricated with a recess 44 (see FIG. 5) to provide a shelf to receive and support the stack of washers 13 in the cylindrical opening 23 formed in the housing 19. The depth of the recess 44 is selected to be slightly less than the thickness of a washer so that the movement of the pusher 43 results in a peeling of the lowerwasher from the stack. The bottom of the V-shaped section of the housing is also provided with a threaded opening 47 (see FIG. 5) to receive a threaded plug 48. The plug 48 may be removed to permit servicing and cleaning as well as alleviating any jamming of the pusher or the advanced washer.

Air lines 51 and 52 are connected to the forward and rearward sections of the cylinder 38. These air lines run to a trigger valve 53 mounted on a housing for the motor 33. The trigger valve is a two-position, three-way valve of commercial manufacture and one type of which may be obtained from Clippard Instrument Laboratory, Cincinnati, Ohio. Operation of the trigger admits air over line 52 to thrust the piston 41 and the pusher 43 forward to advance a washer into the chamber 27. Release of the trigger valve 53 reverses the air to apply pressurized air through line 51 to thrust the piston 41 back to the initial position.

In a like manner, the other piston 42 is provided with an extension or blade 54 (see FIG. 4) which is constructed with a recess 56 to provide a shelf to receive and support the stack of nuts 14 in the cylindrical opening 18. Again a pair of air lines 57 and 58 are provided to move the piston 42 forward and backward. These air lines 57 and 58 run to the trigger valve 53. The trigger valve may have two air passageways which are sequentially brought into position to apply air from a source, not shown, to first operate the piston 42 and then operate the piston 41 so that the leading edge of the nut is advanced into the chamber 24 slightly ahead of the advance of the washer into the chamber.

In the event that the nut is constructed of non-ferromagnetic material and the washer is constructed of ferromagnetic material, then it is necessary to adjust the valve to sequentially apply the air to move the piston 41 prior to the movement of the piston 42. In this instance, the leading edge of the washer is initially advanced into the chamber slightly ahead of the advance of the nut so that the washer is magnetically held by the magnet 34 to thus support the nut in the chamber 24.

The pusher extensions 43 and 54 ride in slotted channels 61 and 62. These channels are at different elevations, channel 61 being below the level of channel 62 so that the nut is fed into the chamber 24 on top of the washer. The sleeve 26 is provided with a pair of axially spaced slots 63 and 64 which are in register with the channel slots 61 and 62. The slots run into each other but are at different elevations and are vertically offset with respect to each other to insure that the washer and nut are supported during movement into overlaying relation within the chamber 24.

Figure 6:
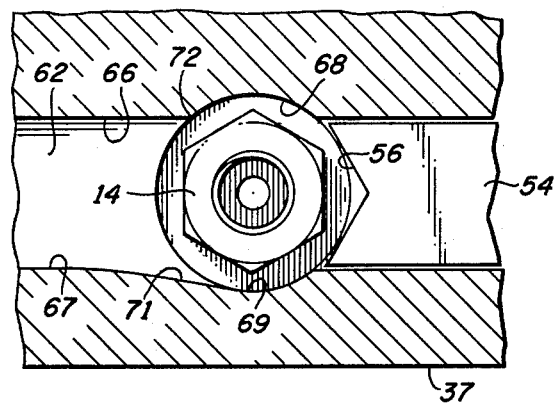
FIG. 6 is an enlarged view of the nut feed channel shown in FIG. 5 to more specifically illustrate the structure of the facility for orienting nuts being advanced into the aligning chamber.

Attention is directed to FIGS. 4 and 6 where it will be noted that side walls 66 and 67 of channel slot 62 are provided with opposite cylindrical indentations 68 and 69. The diameter of a circle partially described by the indentations 68 and 69 is slightly greater than the distance between opposite junctures of the flats formed by the sides of the polygonal nut 14. This diameter is selected to insure that there is sufficient room to permit the rotation of the nut so that the nut may be oriented prior to entry into the polygonal-shaped chamber 24. The forward portion 71 of the circular indentation 69 is relieved to permit the nut to rotate upon a juncture of the nut flats engaging a relatively sharp corner 72 formed at the line of juncture between the side wall 66 and the circular indentation 68. When a nut is advanced into the channel 62, it will be rotated until opposed flats on the nut are lined up with the walls 66 and 67 of the slot 62, whereafter the oriented nut will be pushed into and seated within the polygonal-shaped chamber 24.

The sleeve 26 is rotatably mounted in the housing 19 by means of ball bearings 73 (see FIG. 5) seated in an annular recess 74 formed in the lower extremity of the housing. The sleeve 26 is formed with a peripheral flange 76 that is fitted into the annular recess 74 to hold the ball bearings 73 in place. The recessed portion of the housing 19 is provided with a further annular recess 77 into which is snapped a split retainer ring 78 that functions to engage the flange 76 and, thus, hold the sleeve 26 in the housing 19.

Figure 7:
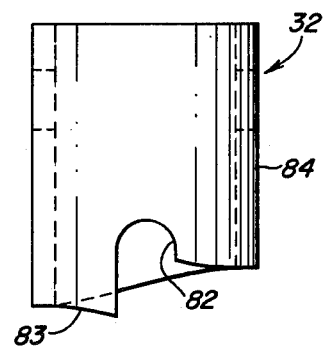
FIG. 7 is a side view of a cam with a slot that is utilized as one clutching element to control the application of rotative power needed to thread the nut onto the threaded stud.

The housing 19 is provided with the tubular extension 31 which is telescoped within a sleeve 79 projecting from the housing for the motor 33. Interposed between the upper end of the tubular housing 31 and the midsection of the driver rod 29 is the clutch means 32 which consists of a clutch pin 81 extending from the rod 29 into a notched slot 82 (see FIGS. 5 and 7) formed as an indentation in a cam surface 83 machined on the end of a cylindrical member 84. The cylindrical member 84 is secured to the inside of the tubular housing 31 so that when the pin 81 is seated within the slot 82, the driver rod 29 is held from rotation and oriented with the nut channel slot ready to accept a nut. A compression spring 86 is positioned about the rod 29 and bears at one end against an inwardly projecting ring 87 seated within a slot formed in the sleeve 79. The other end of the spring bears against the upper end of the tubular extension 31 of the housing. The spring reacts against the ring 87 and the top of the housing to urge these members apart. Inasmuch as the actuator rod 29 is coupled through the motor and the sleeve 79 to the ring 87, the pin 81 secured to the actuator is urged in an upward direction. The lower end of the spring acts to push the tubular extension 31 and the cam cylinder 84 in a downward direction; thus, the pin 81 is held in the slot 82 to hold the tubular extension 31 within the sleeve 79.

When the pin 81 is seated in the slot 82, the polygonal driver rod 29 positions the sleeve 26 to align the slots 63 and 64 with the channels 61 and 62 to permit the passage of the washer and the nut into the chamber 27. The cam surface 83 is sloped so that when the nut and washer assembly operation is completed and a nose 30 of the sleeve 26 is withdrawn from the engaged member 12, the spring 86 will urge and move the pin 81 to engage the cam surface 83. The rotating pin rides along the now stationary cam surface 83 until the pin drops into the slot 82, whereupon the clutch pin is effective to disrupt further rotation of the actuator rod 29 by the air motor 33.

Turning now to a summary of the operation of the apparatus, the attending operator presses the trigger valve 53, whereupon air is sequentially admitted to the rear portions of the air cylinders 38 and 39. The pistons 41 and 42 move forward to advance the pushers 38 and 39 to peel off the lower washer and the lower nut from the respective stacks. The leading edge of the washer 13 is pushed into the chamber 27 slightly ahead of the leading edge of the nut. However, as the washer and nut are seated in the chamber 27, the washer is positioned in overlaying relation to the nut. As the nut is advanced, it will be oriented by the reaction of the juncture 72 against an engaged flat side surface of the nut. The nut will rotate in the circular recesses 68 and 69 to align the flats with the walls 66 and 67 of the channel 62.

With this sequence of operation, it may be appreciated that the nut need not be of ferromagnetic material because the nut will be supported by the washer as the nut and washer are advanced into the chamber 27. If both the nut and washer are constructed of ferromagnetic material then the trigger valve can be adjusted to allow the leading edge of the nut to be pushed into the chamber 27 slightly ahead of the washer. It may further be understood that the two sections of the valve 53 may be constructed to be actuated by two separate triggers, in which case the actuation of the individual triggers will effectuate the selective advancement of either a nut or a washer.

With the nose 30 of the sleeve 26 positioned over a stud 10, the motor housing is pushed downwardly abutting the nose 30 of the sleeve 26 against the surface of either the member 11 or 12, whereafter continued downward movement of the motor 33 moves the driver rod 29 downwardly to withdraw the pin 81 from the notch 82, whereupon rotative power is applied to the polygonal rod 29 to react with the polygonal interior of the sleeve 26 to rotate the sleeve 26. As the rod 29 moves down it will act to rotate the nut and push the overlaying nut and washer onto the sutd 10. The rotation of the sleeve acts to rotate and screw the nut onto the stud 10. As the nut is screwed and advanced on the stud, it will push the washer down into engagement with the top surface of the member 12.

Following the assembly of a washer and a nut on the stud, the motor housing is lifted, whereupon the spring 86 is effective to push the housing extension 31 downwardly relative to the actuator rod 29 so that the pin 81 rides on the cam surface 83 until the pin drops into the notch 82. The dropping of the pin 81 into the notch 82 interrupts the rotation of the rod 29 and the sleeve 26. At the instant of engagement of the pin 81 in the notch 82, the slots 63 and 64 formed in the sleeve 26 are aligned with the channel slots 61 and 62 in anticipation of a subsequent feed of a washer and a nut during the next assembly operation.

In an alternative embodiment of the invention, the nuts and washers may be furnished from supply sources other than the vibratory hoppers 16 and 18. A stack of washers and nuts can be manually loaded within the cylindrical openings 18 and 23. In this instance, a cap will be provided for the cylindrical openings to hold the stacks in place when the apparatus is tilted during operation.

Figure 8:
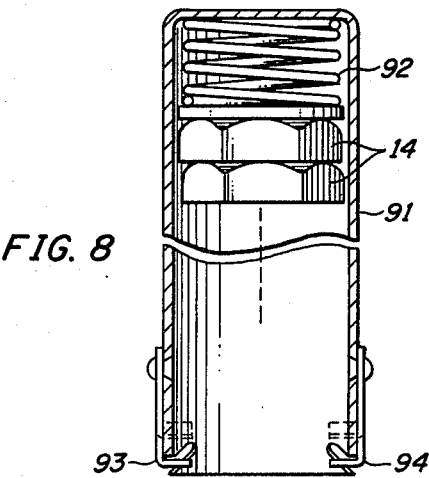
FIG. 8 is a side view partially in section of a cartridge that may be loaded with nuts or washers and substituted for the vibratory nut and washer feed arrangement shown in FIG. 2.

As a further alternative, a cartridge 91, such as shown in FIG. 8 may be filled with nuts or washers and inserted in the cylindrical openings 18 and 23. The cartridge 91 may include a compression spring 92 for urging the stack downwardly, plus a pair of spring clips 93 and 94 for holding the stack within the cartridge. The spring clips 93 and 94 may be pivoted out of position or flexed out of position during the loading of the cartridge with either a stack of washers or nuts. The lowermost washer and nut held by the spring clips are exposed to permit the pushers to advance and peel off the lowermost washer and nut. The use of such a cartridge obviously enhances the portability of the apparatus enabling the operator to assemble nuts and washers at many diverse, separated assembly locations.

A still further modification contemplates replacing the magnet 33 with depressible spring retainers mounted in the opposed side walls of the sleeve 26. In this embodiment, the washer is engaged by shoulders on the spring retainers so as to support the nuts. When the apparatus is pressed toward a stud and stud support, the movement of the actuator rod 29 relative to the sleeve 26 causes the head of the actuator rod to engage the top of the nut, so that a force is exerted to force the nut and washer past the spring retainers which are retracted into suitable slots formed in the side walls of the sleeve. Further, in this instance, the recessed forward portions 44 and 56 of the pushers may be eliminated, so that the pusher ends engage and slide the lower washers and nut from the stacks into the chamber 27.

What is claimed is:

1. An apparatus for assembling a polygonal-shaped nut onto a threaded stud, which comprises:
   a housing having a passageway extending therein for receiving a nut;
   a sleeve rotatably mounted in said housing and having a slot formed in the peripheral wall for passage of the nut, said sleeve having a polygonal-shaped interior conforming to the polygonal-shaped nut;
   a driver rod slidably mounted at one end within a first end section of the sleeve;
   a motor for rotating the driver rod and sleeve;
   a clutching device interposed between said driver rod and motor including a clutching element for holding said driver rod from rotation and for positioning said sleeve to align the slot with the passageway in said housing;
   means mounted in said housing for moving the nut through the passageway and slot into said sleeve; and
   means for retaining the nut within the sleeve while a force is applied to depress said driver rod to move relative to the sleeve to disengage the clutching element and move the rotating driver rod to push the nut along the rotating sleeve onto a threaded stud positioned within the second end section of the sleeve.

2. An apparatus as defined in claim 1, wherein said nut is constructed of ferromagnetic material and said retaining means is a permanent magnet.

3. An apparatus as defined in claim 1, wherein said housing includes means for supporting a stack of nuts, said nut moving means includes means for pushing a lower one of the stack of nuts along said passageway and through the slot into the interior of the sleeve.

4. An apparatus as defined in claim 3, wherein said pushing means include:
   an air cylinder;
   a piston; and
   a blade extending from the piston into alignment with the lower nut of the stack of nuts; said blade being slightly thinner than the height of a nut.

5. An apparatus as defined in claim 3, which includes:
   means for orienting a pushed nut into position with the flats of the polygonal-shaped nut corresponding to the orientation of the flats defining the walls of the interior of said sleeve.

6. An apparatus for assembling a nut having a polygonal shape onto a threaded member extending from a support, which comprises:
   a housing having a tubular extension and a passageway extending through the housing and the tubular extension;
   a sleeve rotatably mounted in said passageway and having a nose section extending beyond the housing, said sleeve having a polygonal interior conforming in shape to the polygonal shape of the nut;
   a driver rod having a section extending through said tubular extension into said sleeve, said rod section extending into the sleeve having a polygonal cross section conforming in shape to the polygonal interior shape of said sleeve;
   clutch means interposed between the tubular extension and said rod;
   means for urging the clutch means to hold the rod from rotation relative to said tubular extension; and
   motor means for applying a rotative force to said drive rod, said motor means adapted to be gripped to force the nose section of the sleeve against the support to slide the driver rod relative to said tubular extension against said urging means to release said clutch whereupon continued movement of said driver rod pushes a nut positioned within the sleeve through said nose section onto a threaded member positioned within the extending section of said sleeve.

7. An apparatus for assembling a polygonal-shaped nut onto a threaded stud extending from a surface, which comprises:
   a housing having a first tubular section extending therethrough;
   a sleeve rotatably mounted in said first tubular section and having a polygonal-shaped interior corresponding to the polygonal shape of the nut; said sleeve having an entry slot for passage of the nut therethrough into the sleeve, and a nose section projecting beyond said first tubular section;
   said housing having a second tubular section for receiving a stack of nuts, said housing also having a channel passageway extending from the bottom of said second tubular section to said slot in the sleeve;
   a pusher slidably mounted in said passageway and having a shelf-like recess for supporting the stack of nuts;
   a rod slidably mounted in the sleeve; said rod having a polygonal shape complementing the polygonal shape of the interior of the sleeve; said rod extending beyond said sleeve and through said first tubular section;
   a clutch means having a first clutching element secured in said first tubular section, and a second clutching element extending from said rod to hold said rod from rotation;
   means for selectively moving the pusher to advance a nut into the sleeve; and
   an air motor means coupled to said rod and having a housing which is gripped to move the apparatus to advance the nose section of the sleeve against the surface from which a threaded stud extends into the sleeve and whereafter the engagement with the surface acts to hold the sleeve to permit the rod to move relative to the sleeve to move the second clutching element from clutching engagement with the first clutching element, whereupon the rod is rotated to rotate the sleeve to thread the nut onto the stud.

8. An apparatus for assembling a nut having a polygonal shape onto a threaded member extending from a support surface, which comprises:
   a sleeve having a polygonal-shaped interior conforming to the polygonal shape of the nut;
   a driver rod partially extending in sliding relation within said sleeve and having a polygonal-shaped cross section wherein the first end of the rod extending in said sleeve defining with the interior of the sleeve a chamber for receiving the nut;
   means for releasably holding the nut within the chamber;
   a housing means including means for rotatably mounting said sleeve with a nose portion thereof extending beyond said housing means in a first direction, said housing means having a tubular extension extending in an opposite direction and surrounding the section of the rod extending from said sleeve;
   a clutching means having a first clutching element mounted on said rod and a second clutching element mounted on said tubular extension;
   means for urging the first and said clutching elements into engagement to hold said driver rod from rotation relative to said tubular extension; and
   motor means coupled to the second end of said driver rod for applying a force tending to rotate said driver rod, which force is effective upon movement of the motor means toward the support surface to forcibly abut the nose portion of the extending section of the sleeve against the support surface whereupon the driver rod slides relative to the tubular extension to move the first clutching element against the effect of said urging means and from engagement with the second clutching element.

9. An apparatus as defined in claim 8, wherein said first clutching element is a pin laterally projecting from said rod, and the second clutching element is a cylinder with a notch formed in one end to receive the pin.

10. An apparatus for assembling a hexagonal nut and a ferromagnetic washer on a threaded stud projecting from a support, which comprises:
   a driver sleeve having a hexagonal interior configuration and a pair of axially spaced wall slots for receiving a washer and a nut;
   a driver rod slidably mounted in said sleeve and having a hexagonal periphery conforming to the hexagonal interior of said sleeve, one end of said rod positioned adjacent to a first of said slots for defining with the interior walls a chamber to receive a nut and washer;
   a first slide having a relieved forward portion for supporting and pushing a nut through a first of said slots into said driver sleeve to position said nut adjacent the end of said driver rod;
   a second slide having a relieved forward portion for supporting and pushing a washer through a second of said slots into said driver sleeve to position the washer beneath the nut;
   magnetic means for holding the washer within the sleeve to support the nut within the sleeve;
   clutching means for holdin said driver rod from rotation to position said slots to receive the nut and the washer advanced by said first and second slides; said clutching means being releasably upon axial movement of said driver rod within said sleeve; and
   motor means secured to said driver rod for applying rotative power to said driver rod when the sleeve is abutted against the support and the motor means is moved toward the support to move the driver rod axially relative to the sleeve to disengage said clutching means.

11. An apparatus for assembling nuts and washers onto a threaded member, which comprises:
   a sleeve having a polygonal-shaped interior conforming to the polygonal shape of a nut, said sleeve having a pair of axially and radially displaced wall slots, a first of which is shaped for passage of a nut while the second is shaped for passage of a washer;
   a first member laterally extending from the sleeve with a channel formed therein to communicate with the first slot for supporting a stack of nuts;
   a second member laterally extending from the sleeve with a channel formed therein to communicate with the second slot for supporting a stack of washers;
   a first pusher mounted in the channel of said first member for advancing a lower nut along said channel, through said first slot and into said hollow sleeve;
   a second pusher mounted in the channel of said second member for advancing a lower washer along said channel, through said second slot and into said hollow sleevel;
   an actuator rod having a polygonal shape conforming to the polygonal shape of the interior of said hollow sleeve slidably mounted within said sleeve;
   motor means connected to said actuator rod for rotating the actuator;
   resilient means for urging the actuator rod into position adjacent to an upper wall of said first slot;
   a clutch means interposed between said actuator rod and said slide having a clutching element attached to the actuator rod which is released upon pressing the sleeve against a support surface for a threaded member whereupon the actuator rod moves within said sleeve to advance a nut and washer onto the threaded member, said sleeve of the clutch being effective to impart rotative motion to said actuator rod to rotate the sleeve and the nut to screw the nut onto the threaded member.

12. An apparatus as defined in claim 11, wherein said clutch means includes a cam surface having a notch therein for receiving said clutching element to hold said sleeve in position to align said first and second slots with said first and second pushers.

* * * * *